(12) United States Patent
Nasu et al.

(10) Patent No.: US 10,160,069 B2
(45) Date of Patent: Dec. 25, 2018

(54) METHOD FOR MANUFACTURING HEADREST STAY

(71) Applicants: TOYOTA BOSHOKU KABUSHIKI KAISHA, Aichi-ken (JP); TOKAI CHEMICAL INDUSTRIES, LTD., Gifu (JP)

(72) Inventors: Hiroyuki Nasu, Aichi-ken (JP); Akihide Ozaki, Aichi-ken (JP); Koki Uemura, Gifu-ken (JP)

(73) Assignees: TOYOTA BOSHOKU KABUSHIKI KAISHA, Aichi-ken (JP); TOKAI CHEMICAL INDUSTRIES, LTD., Gifu (JP)

( * ) Notice: Subject to any disclaimer, the term of this patent is extended or adjusted under 35 U.S.C. 154(b) by 169 days.

(21) Appl. No.: 15/065,143

(22) Filed: Mar. 9, 2016

(65) Prior Publication Data
US 2016/0263713 A1    Sep. 15, 2016

(30) Foreign Application Priority Data
Mar. 10, 2015    (JP) .................................. 2015-046936

(51) Int. Cl.
*B60N 2/48* (2006.01)
*B23P 15/00* (2006.01)
*B60N 2/809* (2018.01)

(52) U.S. Cl.
CPC ............ *B23P 15/00* (2013.01); *B60N 2/4808* (2013.01); *B60N 2/809* (2018.02)

(58) Field of Classification Search
CPC ...... B21D 41/045; B21D 41/04; B21D 51/36; B60N 2/4808; B60N 2002/4897; B23P 15/00
See application file for complete search history.

(56) References Cited

U.S. PATENT DOCUMENTS 2,309,181 A * 1/1943 Franck .................. B21D 41/04
29/422
3,468,007 A * 9/1969 Masanobu ............. B21D 39/00
123/90.61

(Continued)

FOREIGN PATENT DOCUMENTS

| CN | 102082353 | 9/2013 |
| CN | 102215717 | 3/2014 |

(Continued)

OTHER PUBLICATIONS

English translation of KR20130110248A.*

(Continued)

*Primary Examiner* — Jun Yoo
(74) *Attorney, Agent, or Firm* — Greenblum & Bernstein, P.L.C.

(57) ABSTRACT

A headrest stay is manufactured with a metal round pipe having a predetermined length and a predetermined thickness by performing a boring process on the metal round pipe by a cutting length of 5 mm or more from each of both distal ends of the metal round pipe to form a thin-walled portion that is thinner than the predetermined thickness; forming each of the distal ends of the metal round pipe into an curved chamfered shape having a radius of 5 mm or more by inserting each of the distal ends of the metal round pipe into a cylindrical hole; and bending the metal round pipe to have a shape of the headrest stay.

3 Claims, 6 Drawing Sheets

(56) References Cited

U.S. PATENT DOCUMENTS

| | | |
|---|---|---|
| 9,120,142 B2 | 9/2015 | Matt et al. |
| 2011/0104959 A1 | 5/2011 | Asai et al. |
| 2011/0248540 A1 | 10/2011 | Yamada et al. |

FOREIGN PATENT DOCUMENTS

| | | |
|---|---|---|
| DE | 10 2008 026 814 | 12/2009 |
| JP | S49-094558 | 9/1974 |
| JP | 51-23392 | 7/1976 |
| JP | 1-170535 | 7/1989 |
| JP | 9-86250 | 3/1997 |
| KR | 20130110248 A * | 10/2013 |

OTHER PUBLICATIONS

Official Action, along with English-language translation thereof, issued in DE Appl. No. 10 2016 203 868.0 and dated Jul. 28, 2017.
Information Offer Form, along with English-language translation thereof, for JP2015-46936 dated Jul. 14, 2017.
Information Offer Form, along with English-language translation thereof, for JP2015-46936 dated Jul. 25, 2017.
Office Action dated Jun. 19, 2018 in the corresponding Chinese patent application No. 201610136368 (and English translation thereof).
Office Action dated Aug. 28, 2018 in the corresponding Japanese patent application No. 2015-046936 (and English translation thereof).

* cited by examiner

METHOD FOR MANUFACTURING HEADREST STAY

CROSS-REFERENCE TO RELATED APPLICATION

This application claims priorities from Japanese Patent Application No. 2015-046936 filed on Mar. 10, 2015, the entire subject matters of which is incorporated herein by reference.

TECHNICAL FIELD

The present disclosure relates to a method for manufacturing a headrest stay.

BACKGROUND

A vehicular seat is required to be adapted to the provision of an inner projection in European automobile standards ECE No. 21 to protect passengers in a back seat. According to the provision of the inner projection, all projections that may collide with a passenger's head are required such that a terminal portion of a distal end thereof is formed to have an R chamfered shape with a radius of 3.2 mm or more. In a headrest stay of a vehicular seat disclosed in JP-A-H09 (1997)-086250, a terminal portion of a distal end of a headrest stay is subjected to a spinning process or a swaging process to have an R chamfered shape with a radius of 5 mm or more.

In the related art JP-A-H09(1997)-086250, the terminal portion of the distal end of the headrest stay is subjected to the spinning process or the swaging process. However, the related art is problematic in that both the spinning process and the swaging process push a ladle-shaped part from a direction perpendicular to a rotating axis while imparting rotation to the headrest stay, so that R is small and thereby cracks may undesirably occur if the headrest stay is shaped to have a high tightening force.

SUMMARY

The present disclosure is made in consideration of the above-mentioned circumstances, and one of objects of the present disclosure is to provide a method for manufacturing a headrest stay, in which an R chamfered shape is formed on a terminal portion of a distal end of the headrest stay while preventing cracks or the like from occurring.

According to an illustrative embodiment of the present disclosure, there is provided a method for manufacturing a headrest stay with a metal round pipe having a predetermined length and a predetermined thickness, the method including: performing a boring process on the metal round pipe by a cutting length of 5 mm or more from each of both distal ends of the metal round pipe to form a thin-walled portion that is thinner than the predetermined thickness; forming, after performing the boring process, each of the distal ends of the metal round pipe into an curved chamfered shape having a radius of 5 mm or more by inserting each of the distal ends of the metal round pipe into a cylindrical hole provided in a mold and pressing the distal ends of the metal round pipe against a bottom surface of the cylindrical hole, the cylindrical hole having an inner surface that slidably fit to an outer surface of the metal round pipe and a corner portion between the inner surface and the bottom surface, the corner portion having a concave curved shape having a radius of 5 mm or more; and bending the metal round pipe to have a shape of the headrest stay.

DETAILED DESCRIPTION

Hereinafter, an illustrative embodiment of the present disclosure will be described with reference to the accompanying drawings.

Figure 1:
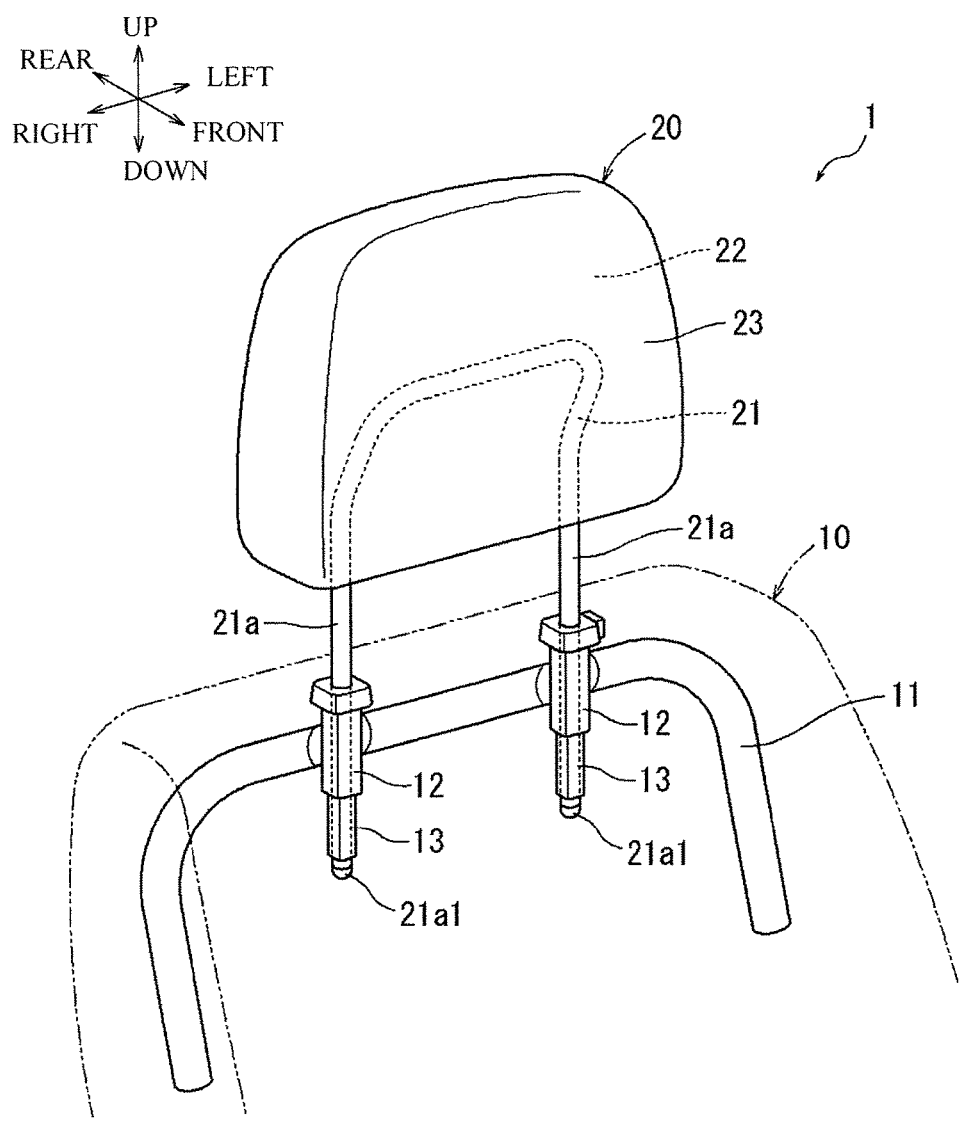
FIG. 1 is a perspective view illustrating a state where a headrest equipped with a headrest stay according to an embodiment of the present disclosure is attached to a seat back.

FIGS. 1 to 4 illustrate an embodiment of the present disclosure. As illustrated in FIG. 1, a headrest 20 equipped with a headrest stay 21, which is manufactured by the manufacturing method of this embodiment, is applied to a vehicular seat 1. Steel square pipe-shaped holders 12 are attached to two places, namely, left and right places of an upper frame 11 constituting an upper skeleton of a seat back 10 of the vehicular seat 1. The headrest stay 21 of the headrest 20 is inserted into the holders through cylindrical supports 13 to be mounted to the vehicular seat.

The upper frame 11 is formed by bending a steel round pipe in an inverted U shape, and is welded at both lower ends of left and right sides thereof to upper ends of side frames (not shown) that constitute left and right sides of the seat back 10 and are long in a longitudinal direction. The holders 12 are welded to two places, namely, left and right places of a central portion of the upper frame 11 in a width direction of the seat by inserting the supports 13 into the corresponding holders.

Each support 13 is a component made of synthetic resin and is formed to have an external shape of a square pipe whose body is fitted into a pipe of each holder 12. Each support 13 is attached to the corresponding holder 12 so as to rotation stop relative to the holder 12 by inserting the support into the pipe of each holder 12 from an upper position of the seat.

The headrest 20 is formed such that an upper portion of the headrest stay 21 made by bending the steel round pipe in the inverted U shape is embedded in a headrest pad 22 made of an urethane material that is a cushioning material. An outer surface of the headrest pad 22 is covered with a headrest cover 23 that is a covering material. The headrest stay 21 is configured such that leg portions 21a provided on both sides thereof protrude downwards from a bottom surface of the headrest pad 22. The headrest 20 is retained and mounted to the upper portion of the seat back 10 by inserting the leg portions 21a into a through hole of each support 13.

Figure 2:
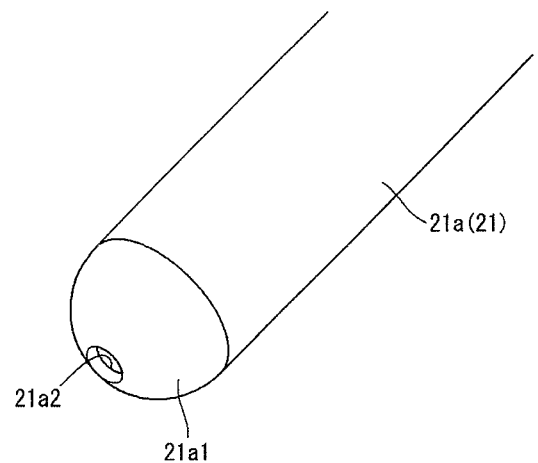
FIG. 2 is a perspective view illustrating a distal end of the headrest stay according to the embodiment.

In the state where the headrest 20 is mounted to the upper portion of the seat back 10, a distal end 21a1 of each leg portion 21a of the headrest stay 21 protrudes downwards from a lower end of a body of each support 13 to be exposed to an internal space of the seat back 10. As illustrated in FIG. 2, an R chamfered shape having a radius of 5 mm or more is formed on the distal end 21a1 of the headrest stay 21. Specifically, for example, when the headrest stay 21 has an outer radius of 14 mm and a thickness of 2.3 mm, it is possible to adopt the R chamfered shape having the radius of 5 mm to 7 mm, but the radius of 6.5 mm is optimum. In this case, a hole 21a2 formed in a lowermost end of the distal end 21a1 is set to have a diameter of about 3.7 mm.

Figure 3:
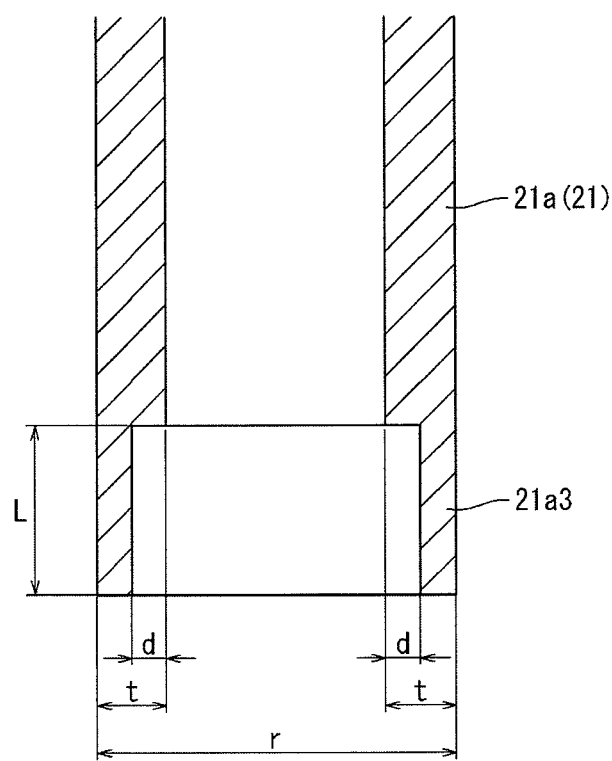
FIG. 3 is a sectional view illustrating a state where the distal end of the headrest stay according to the embodiment is subjected to a boring process.

A method for manufacturing the headrest stay 21 will be described. As illustrated in FIG. 3, the steel round pipe having an outer radius r of a predetermined length and an initial thickness t is prepared and then a boring process is performed by cutting both ends of the pipe over a cutting length L that is 1 to 1.57 times as long as the radius of the R chamfered shape by a cutting depth d. Here, the predetermined length refers to a length that may be formed in the shape of the headrest stay 21 when the steel round pipe is bent in a final process. Specifically, for example, the steel round pipe that is 14 mm in the outer radius r of the predetermined length and is 2.3 mm in initial thickness t is prepared and then the boring process is performed by cutting both ends of the pipe over a region extending from each end to a cutting length L of 8.8 mm by the cutting depth d of 1.3 mm. Thus, thin-walled portions 21a3 each having the thickness of 1.0 mm are formed on both ends of the steel round pipe over a region extending from each end to a length of 8.8 mm. Here, the steel round pipe having the outer radius r of 14 mm may adopt the initial thickness t up to 1.6 mm to 2.9 mm. However, since a different cutting depth d is applied, the cutting depth ranging from 0.6 mm to 1.0 mm is required when the initial thickness t is 1.6 mm and the cutting depth ranging from 0.8 mm to 1.9 mm is required when the initial thickness t is 2.9 mm. That is to say, a ratio of the cutting depth d to the initial thickness t is in the range of 40% to 60%. That is, the thickness of the thin-walled portion 21a3 is preferably in the range of 40% to 60% of the initial thickness t when the initial thickness t of the steel round pipe is in the range of 1.6 mm to 2.9 mm.

Figure 4:
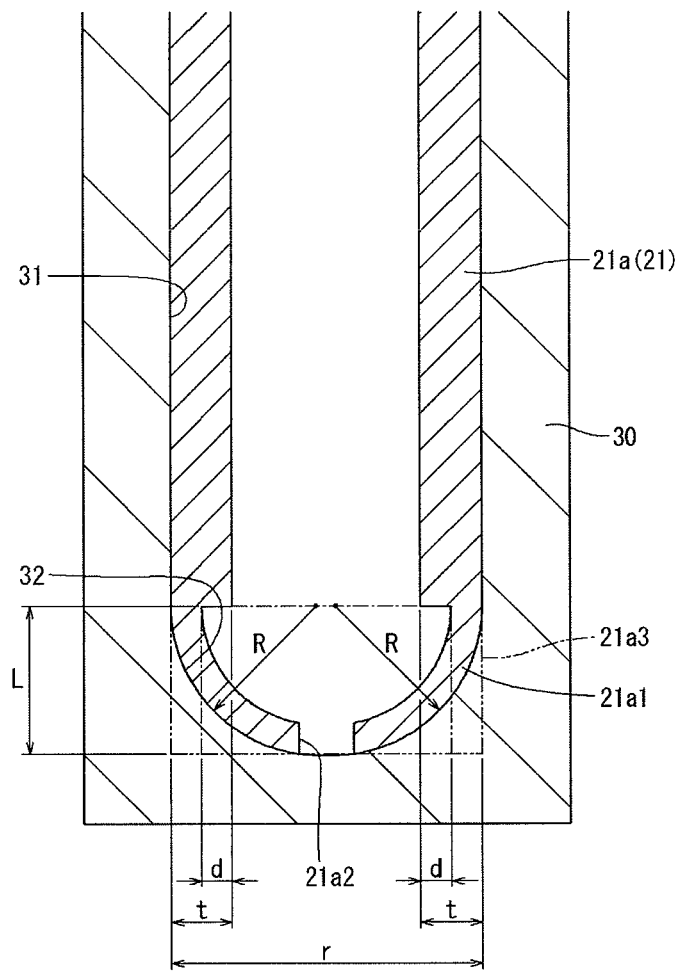
FIG. 4 is a sectional view illustrating a state where the distal end of the headrest stay according to the embodiment is subjected to a press process.

Next, as illustrate in FIG. 4, both ends of the steel round pipe that has been subjected to the boring process are pushed against a press mold 30 that has the R shape with the radius of 5 mm or more on a corner portion of an inner surface thereof, so that the R shape is imparted to the distal end 21a1. A bottomed cylindrical hole 31 having a diameter slightly larger than the outer radius r of the steel round pipe is formed in the press mold 30. A concave curved surface 32 having a radius R is formed in the corner portion between a side surface and a bottom surface of the cylindrical hole 31. Specifically, for example, when the R chamfered shape having the radius of 6.5 mm is imparted to both ends of the steel round pipe having the outer radius r of 14 mm, the inner diameter of the cylindrical hole 31 of the press mold 30 is slightly larger than 14 mm. The concave curved surface 32 of the R shape having the radius of 6.5 mm is formed in the corner portion between the side surface and the bottom surface of the cylindrical hole 31. The steel round pipe having the thin-walled portion 21a3 with the thickness of 1.0 mm over a region extending from each end to the length of 8.8 mm is pushed against the cylindrical hole 31 of the press mold 30 until the diameter of the hole 21a2 formed in the lowermost end of the distal end 21a1 becomes about 3.7 mm. In this case, an entire outer surface of the thin-walled portion 21a3 is in close contact with the concave curved surface 32 that has the radius of 6.5 mm and is formed in the corner portion of the bottom surface of the cylindrical hole 31 of the press mold 30.

When one desires to perform a molding operation in the state where the thin-walled portion 21a3 that has the thickness of 1.0 mm and is formed on each end of the steel round pipe is in close contact with the entire concave curved surface 32 that is formed in the corner portion between the side surface and the bottom surface of the cylindrical hole 31 of the press mold 30 and has the R shape with the radius of 6.5 mm, it is necessary for the thin-walled portion 21a3 to have the length of 10.2 mm. That is, it is necessary to set the cutting length L to 10.2 mm. The reason is because the cutting length L is set to a quarter of a circumference of a section of the concave curved surface 32 in FIG. 4. In this case, when the R chamfered shape with the radius of 6.5 mm is imparted to both ends of the steel round pipe, the diameter of the hole 21a2 formed in the lowermost end of the distal end 21a1 is equal to about 1.0 mm. Further, in the case of imparting the R chamfered shape with the radius of 5 mm to 7 mm, the length of the thin-walled portion 21a3 may be set to 1 to 1.57 times as long as the radius of the R chamfered shape. That is, if the radius is 5 mm, the length of the thin-walled portion 21a3 may be set to 5 mm to 7.9 mm. If the radius is 7 mm, the length of the thin-walled portion 21a3 may be set to 7 mm to 11.0 mm.

The steel round pipe having on both ends thereof the R chamfered shape is bent in the inverted U shape, as illustrated in FIG. 1, and the outer surface thereof may be plated, as necessary, to obtain the headrest stay 21. Subsequently, the headrest stay 21 is set with a urethane foam mold and is expanded and solidified by injecting a liquid urethane raw material. The headrest stay 21 is integrated with the headrest pad 22 and simultaneously is covered with the headrest cover 23 to make the headrest 20.

The embodiment configured as described above has the following operational effects. When the R chamfered shape is imparted to both ends of the steel round pipe, the boring process is performed over a region extending from each end to the length of 5 mm or more to form the thin-walled portion 21a3 and then the thin-walled portion 21a3 is bent to conform to the shape of the concave curved surface 32 by press molding.

Thus, it is easy to bend the end and a problem such as cracks rarely occurs. Further, the boring process is to cut a portion of the steel round pipe that is 40% to 60% of the initial thickness t over a region extending from each end to the length that is 1 to 1.57 times as long as the radius of the R chamfered shape, namely, 5 mm to 11 mm, in an annular shape. Therefore, the rigidity of the thin-walled portion 21a3 is maintained, so that an external shape is rarely changed before the press molding, and buckling distortion of the thin-walled portion 21a3 is suppressed during the press molding to prevent cracks from occurring.

Figure 5:
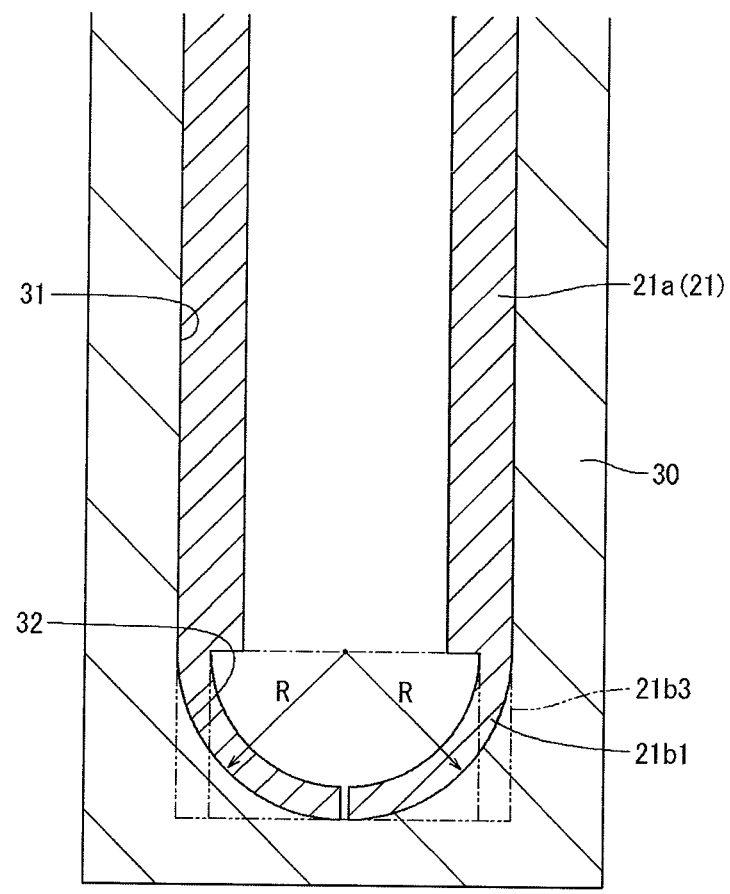
FIG. 5 is a sectional view illustrating a distal end of a headrest stay according to another embodiment of the present disclosure.

FIG. 5 is a sectional view illustrating a distal end 21b1 of a headrest stay 21 according to another embodiment of the present disclosure. In the distal end 21b1, R chamfered shapes formed on both ends of the steel round pipe are continuously connected to each other without forming a hole in the lowermost end, so that the distal end is formed as a hemispherical surface having the same radius as the outer radius R of the steel round pipe. Here, a bottom surface of a cylindrical hole 31 of a press mold 30 is formed as a dented hemispherical surface with the radius R. Further, the cutting length L of the thin-walled portion 21b3 formed by the boring process is set to 1.57 times (¼ of the circumference of the circle having the radius R) as long as the radius R. Other configurations remain the same as the above-described embodiment. In such a shape, since no hole is present on the lowermost end of the distal end 21b1, the terminal portion may be formed in a smoother R chamfered shape.

Figure 6:
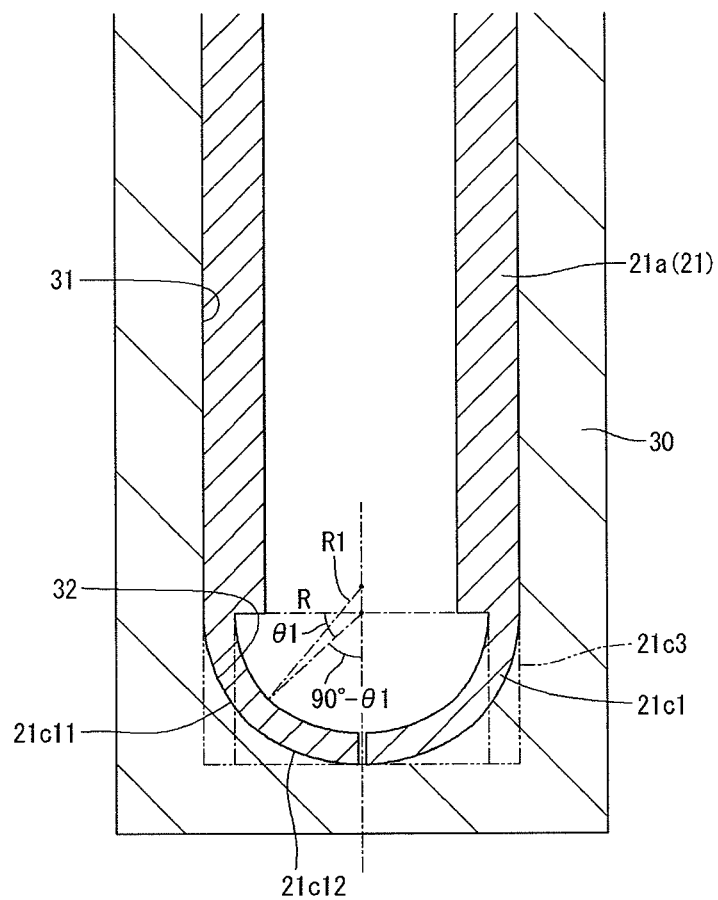
FIG. 6 is a sectional view illustrating a distal end of a headrest stay according to a further embodiment of the present disclosure.

FIG. 6 is a sectional view illustrating a distal end 21c1 of a headrest stay 21 according to a further embodiment of the present disclosure. In the distal end 21c1, R chamfered shapes formed on both ends of the steel round pipe are formed by connecting R planes of two steps to each other. That is, the distal end is composed of a first R part 21c11 and a second R part 21c12. The first R part extends from an upper end (end of a portion having the initial thickness t) of the thin-walled portion 21c3 to an angle θ1 with the same radius R as the outer radius R of the steel round pipe. The second R part extends from the first R part to an angle 90°-θ1 and is a part of an arc having a radius R1 that is larger than the outer radius R of the steel round pipe. The first R part 21c11 and the second R part 21c12 are smoothly and continuously connected to each other without forming a hole on the lowermost end. Here, a bottom surface of a cylindrical hole 31 of a press mold 30 is formed as a curved surface that is dented to correspond to the first R part 21c11 and the second R part 21c12. Further, the cutting length L of the thin-walled portion 21c3 formed by the boring process is equal to an arc length sum of the first R part 21c11 and the second R part 21c12. Other configurations remain the same as the above-described embodiment. In such a shape, since no hole is present on the lowermost end of the distal end 21c1, the terminal portion may be formed in a smoother R chamfered shape and R of the lowermost end may be further increased.

Figure 7:
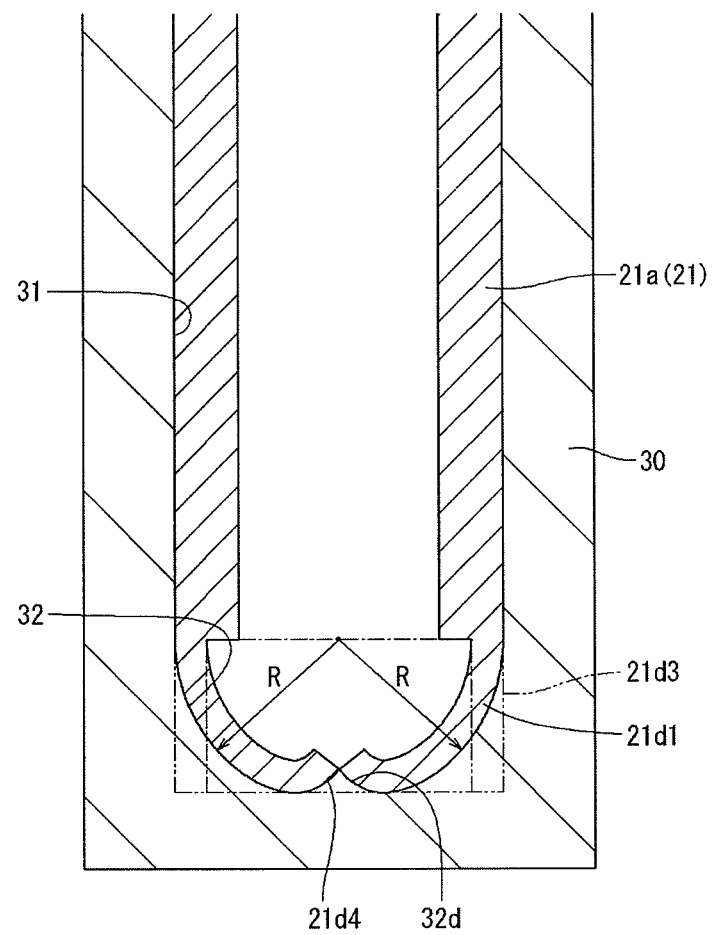
FIG. 7 is a sectional view illustrating a distal end of a headrest stay according to still another embodiment of the present disclosure.

FIG. 7 is a sectional view illustrating a distal end 21d1 of a headrest stay 21 according to still another embodiment of the present disclosure. In the distal end 21d1, R chamfered shapes formed on both ends of the steel round pipe are connected to each other without forming a hole in the lowermost end, and a recess 21d4 is formed along a central axis of the pipe to be dented towards a pipe body. Here, a bottom surface of a cylindrical hole 31 of a press mold 30 is formed as a dented hemispherical surface with the radius R, and a projection 32d is formed on a corresponding portion along the central axis of the pipe. Further, the cutting length L of the thin-walled portion 21d3 formed by the boring process is set to 1.57 times (¼ of the circumference of the circle having the radius R) as long as the R length. Other configurations remain the same as the above-described embodiment. In such a shape, since the recess 21d4 is formed on the lowermost end of the distal end 21d1, the terminal portion may be formed in a smoother R chamfered shape without having a burr or the like.

Although the specific embodiments have been described above, the present disclosure is not limited to the above-mentioned appearance and configuration but can be modified in various forms without departing from the gist thereof. For example, the following is possible.

In the above-described embodiment, the steel round pipe having the outer radius of 14 mm is used. However, without being limited thereto, it is possible to use various steel round pipes having the outer radius of 13 mm, 15 mm or the like, as necessary, in a range available for the headrest stay.

In the above-described embodiment, a method where the steel round pipe is used as a metal round pipe and plating is performed after molding is adopted. However, without being limited thereto, it is possible to use a round pipe made of other metallic materials such as stainless steel.

In the above-described embodiment, when the headrest stay 21 has the outer radius of 14 mm and the thickness of 2.3 mm, the R chamfered shape having the radius of 6.5 mm is formed, so that the hole 21a2 having the diameter of about 3.7 mm is formed on the lowermost end of the distal end 21a1. However, without being limited thereto, the diameter of the hole 21a2 may be freely selected as long as it obeys the car law.

In the above-described embodiment, the present disclosure is applied to the vehicular seat. However, without being limited thereto, the invention may be applied to a seat of a railroad car, a ship or the like.

What is claimed is:

1. A method for manufacturing a headrest stay with a metal round pipe having a predetermined length and a predetermined thickness, the method comprising:
    performing a boring process on the metal round pipe by a cutting length of 5 mm or more from each of both distal ends of the metal round pipe to form a thin-walled portion that is thinner than the predetermined thickness;
    forming, after performing the boring process, each of the distal ends of the metal round pipe into a curved chamfered shape having a radius of 5 mm or more by inserting each of the distal ends of the metal round pipe into a cylindrical hole provided in a mold and pressing the distal ends of the metal round pipe against a bottom surface of the cylindrical hole, wherein the cylindrical hole comprises: (i) the bottom surface; (ii) a straight cylindrical portion having an inner surface that slidably fit to an outer surface of the metal round pipe and supports the outer surface of the metal round pipe while the distal ends of the metal round pipe are pressed against the bottom surface; and (iii) a corner portion that connects the inner surface of the straight cylindrical portion and the bottom surface, the corner portion having a concave curved shape having a radius of 5 mm or more; and
    bending the metal round pipe to have a shape of the headrest stay,
    wherein a length of the straight cylinder portion of the cylindrical hole is longer than the cutting length of the metal round pipe.

2. The method according to claim 1,
    wherein the curved chamfered shape has the radius of 5 mm to 7 mm, and
    wherein the boring process is performed on the metal round pipe by the cutting length that is 1 to 1.57 times as long as the radius of the curved chamfered shape from each of both distal ends of the metal round pipe to form the thin-walled portion in an annular shape having 40% to 60% of the predetermined thickness of the metal round pipe.

3. The method according to claim 1,
    wherein the bending of the metal pipe is performed after forming each of the distal ends of the metal round pipe into the curved chamfered shape.

* * * * *